(12) United States Patent
Blazberg

(10) Patent No.: US 9,048,643 B2
(45) Date of Patent: Jun. 2, 2015

(54) BOX FOR STORING A MULTI SOCKET EXTENSION AND CABLES WHILE IN USE

(71) Applicant: Israel Blazberg, Ramat Gen (IL)

(72) Inventor: Israel Blazberg, Ramat Gen (IL)

( * ) Notice: Subject to any disclaimer, the term of this patent is extended or adjusted under 35 U.S.C. 154(b) by 63 days.

(21) Appl. No.: 13/892,329

(22) Filed: May 13, 2013

(65) Prior Publication Data

US 2014/0332526 A1  Nov. 13, 2014

(51) Int. Cl.
*H02G 3/08* (2006.01)
*H02G 11/00* (2006.01)

(52) U.S. Cl.
CPC ............... *H02G 3/081* (2013.01); *H02G 11/00* (2013.01)

(58) Field of Classification Search
CPC .................. H02G 3/081; H02G 11/00
USPC ........ 220/3.8, 507, 529, 4.02, 4.09, 4.32, 3.7, 220/4.26, 554; 206/499, 503
See application file for complete search history.

(56) References Cited

U.S. PATENT DOCUMENTS

| | | | | | |
|---|---|---|---|---|---|
| 3,113,694 | A | * | 12/1963 | Sulzer | 220/62 |
| 3,612,637 | A | * | 10/1971 | Betts | 312/290 |
| 5,011,033 | A | * | 4/1991 | Roth | 220/3.94 |
| 6,903,265 | B1 | * | 6/2005 | VanderVelde et al. | 174/481 |
| 7,562,787 | B2 | * | 7/2009 | Serrano | 220/507 |
| 7,829,797 | B2 | * | 11/2010 | VanderVelde et al. | 174/481 |

* cited by examiner

*Primary Examiner* — Robert J Hicks
*Assistant Examiner* — Kareen Rush

(57) ABSTRACT

A box made of plastic or any other rigid material that is designed to store a multi-socket extension and excess cables. The box includes a frame, top cover, bottom cover, and inner tray. The covers are installed over the frame using sliding tracks. The inner tray is installed in the frame and serves as a partition between the box's upper part and lower part. First, the inner tray is installed in the frame. The bottom cover is then assembled. The multi-socket extension is placed on the inner tray. The excess cables are now placed inside the box preferably in the space beneath the inner tray and the box is closed with the top cover.

1 Claim, 8 Drawing Sheets

BOX FOR STORING A MULTI SOCKET EXTENSION AND CABLES WHILE IN USE

TECHNICAL FIELD

Figure 1:
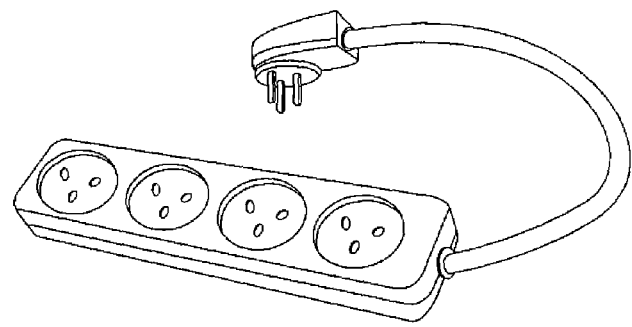
Figure 2:
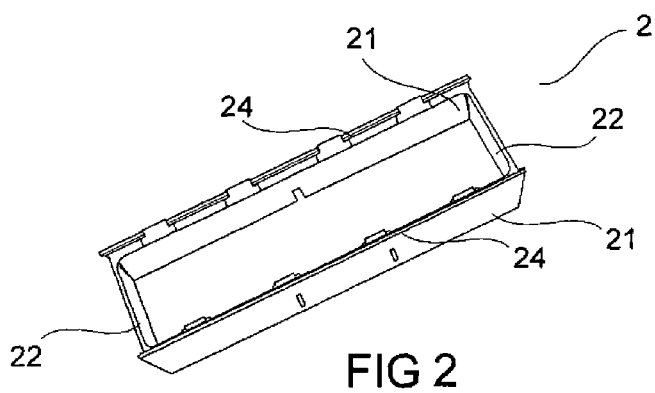
Figure 3:
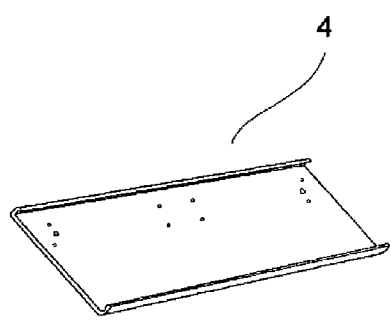
Figure 4:
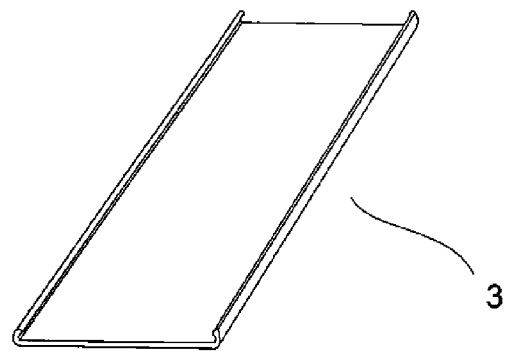
Figure 5:
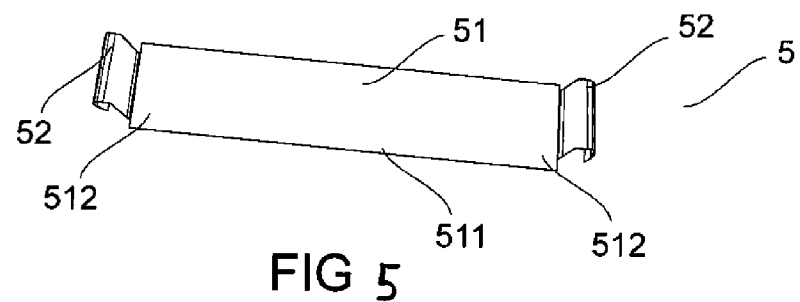
Figure 6:
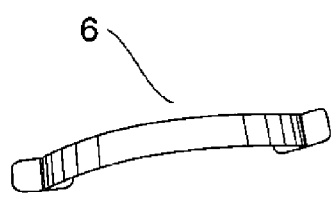
Figure 7:
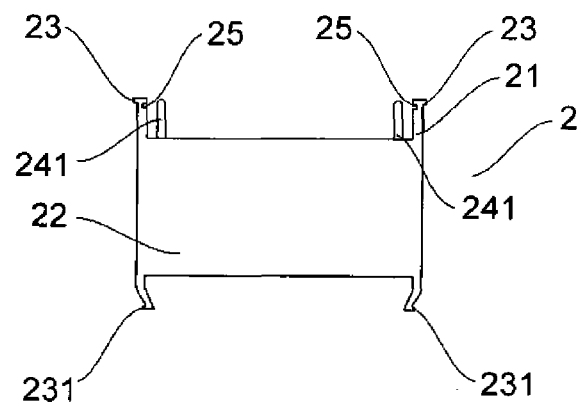
Figure 8:
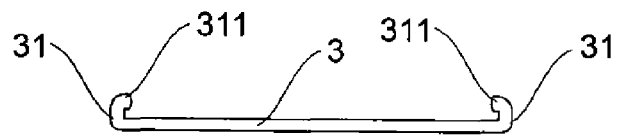
Figure 9:
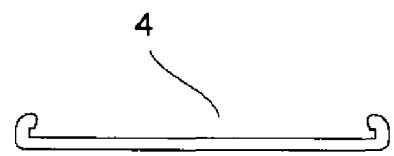
Figure 10:
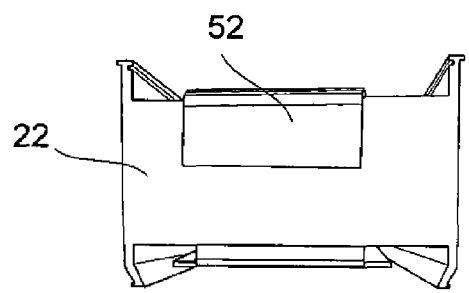
Figure 11:
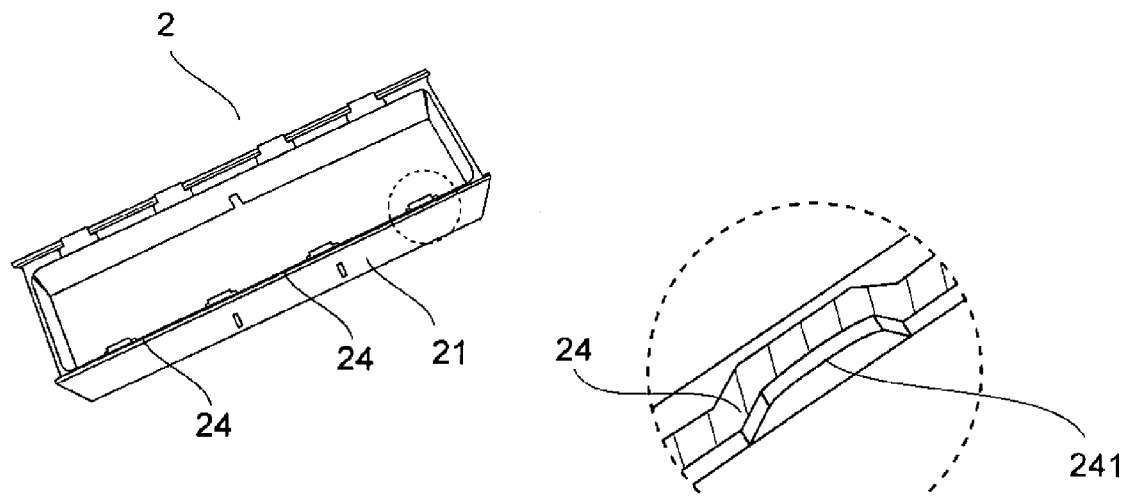
Figure 12:
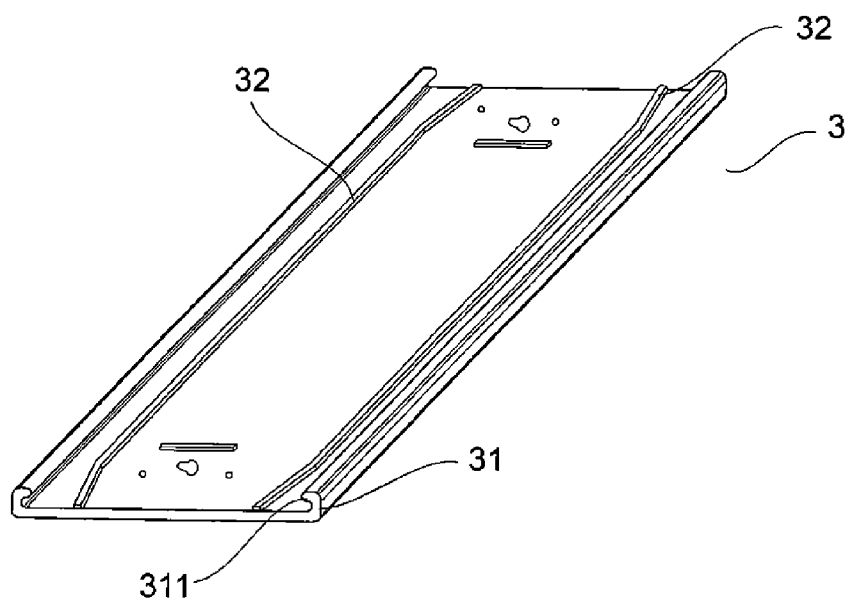
Figure 13:
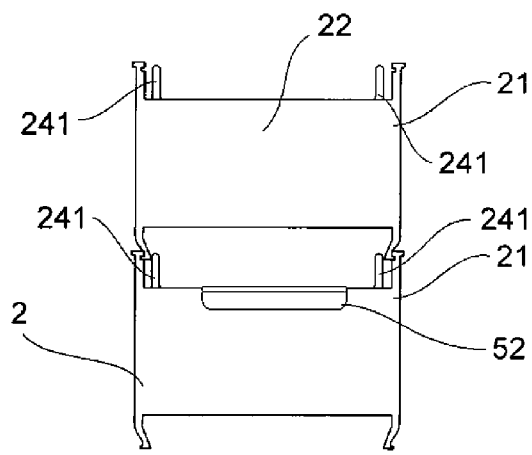
Figure 14:
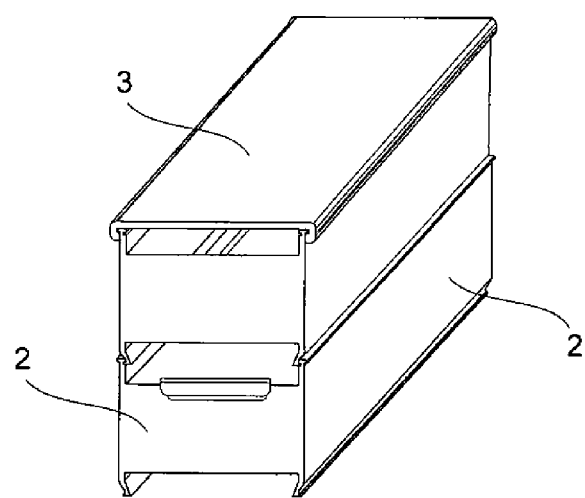
Figure 15:
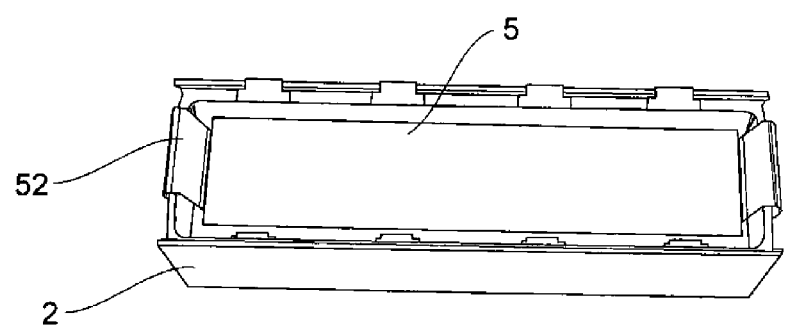
Figure 18:
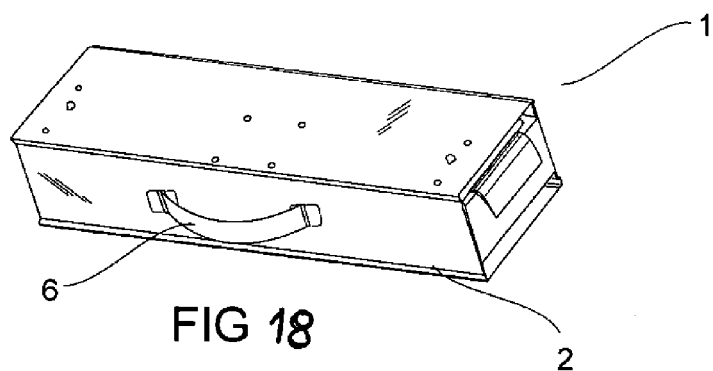
Figure 16:
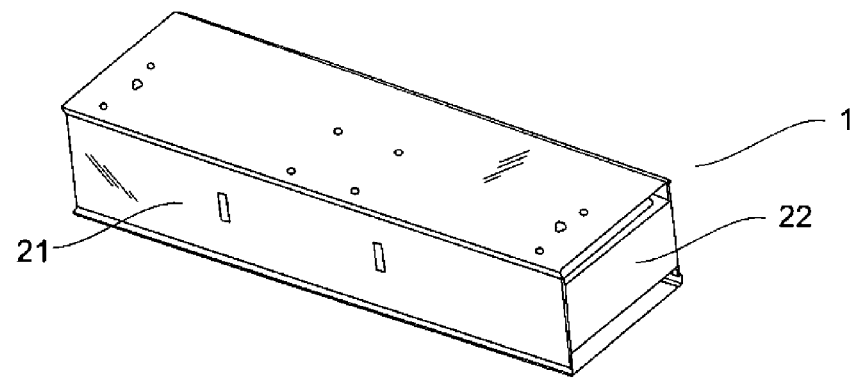
Figure 17:
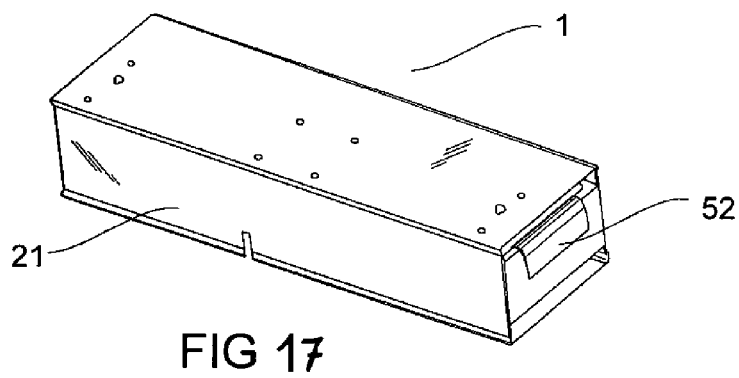
Figure 19:
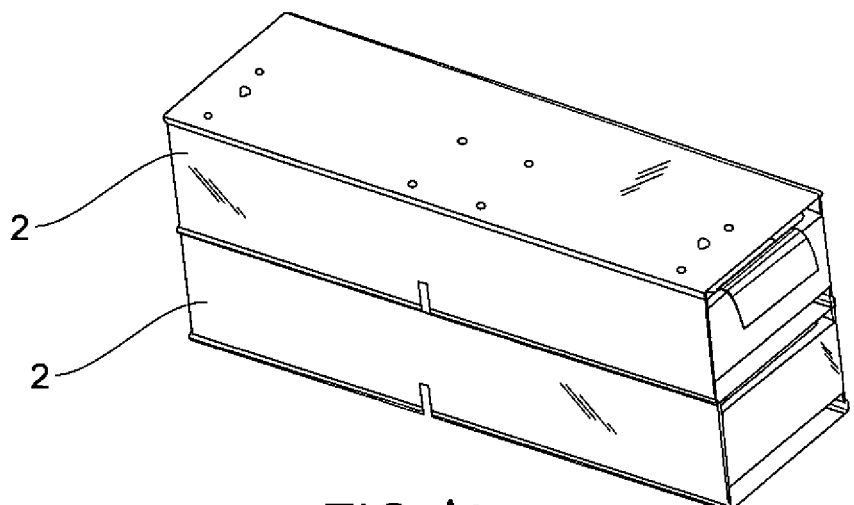
Figure 20:
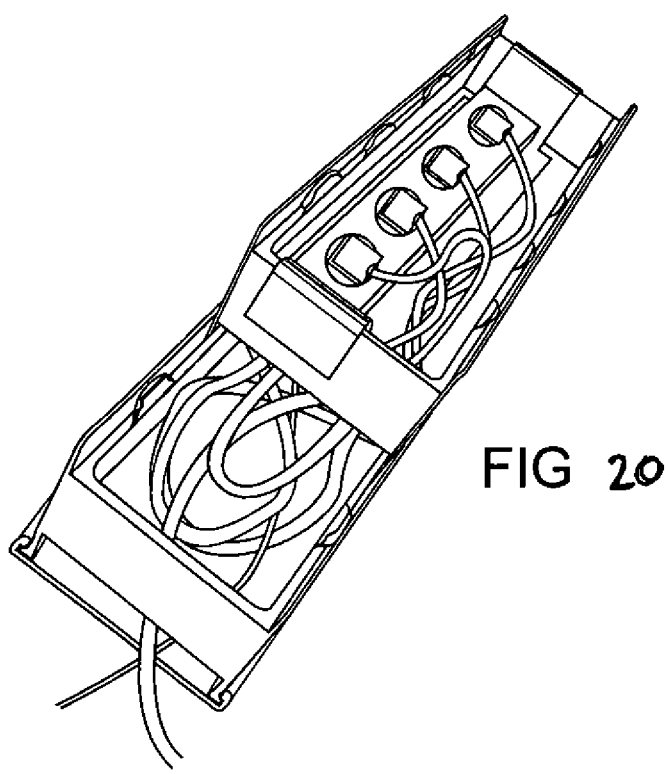
Figure 21:
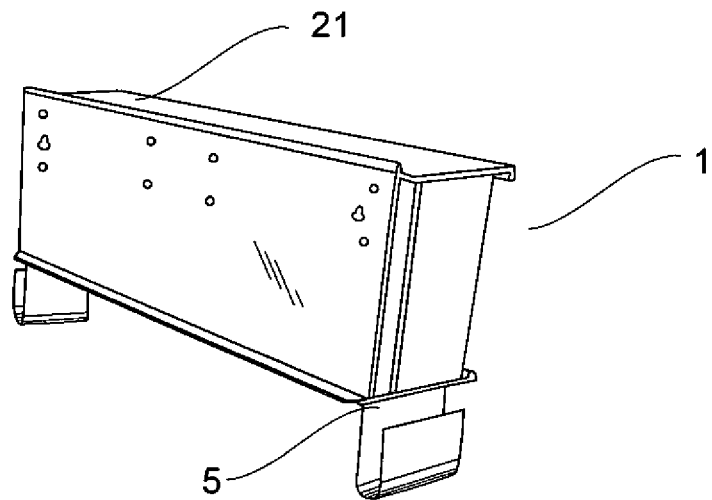
Figure 22:
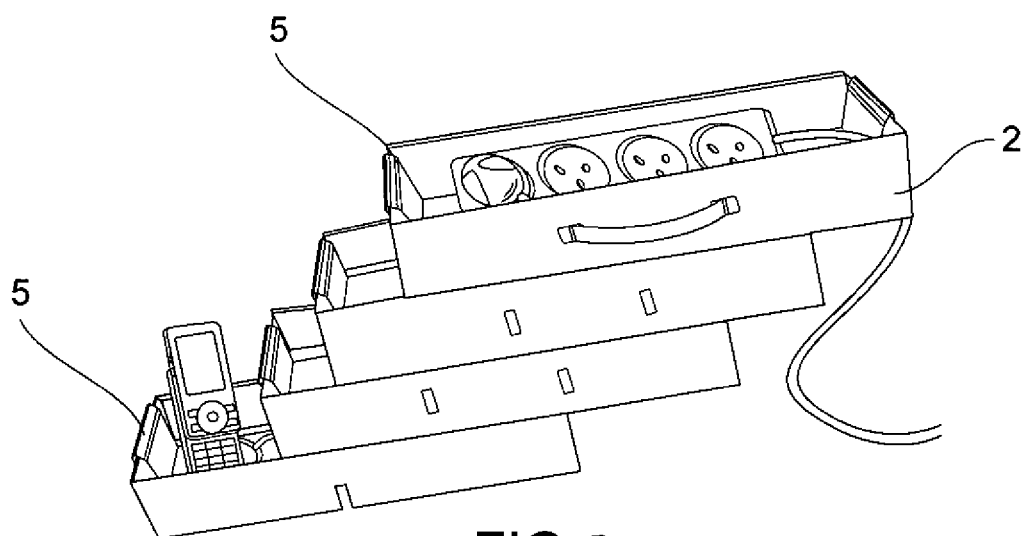

The present invention refers to a box designed for storing a multi-socket extension and excess cables during use.

BACKGROUND ART

The general public uses electrical appliances and it is customary to use a multi-socket extension with several sockets, usually between two and ten, but sometimes even more, as depicted for instance in Drawing No. 1. The multi-socket extension is used primarily when the user wished to simultaneously plug several appliances into one electrical socket. Using a multi-socket extension and having several appliances plugged into a socket simultaneously causes an aesthetic nuisance and creates disorder, mainly due to the fact that the multi-socket extension is usually placed on the floor of the room, on the kitchen counter, on the computer desk, etc. and multiple cables are scattered in disorder around the electrical appliances. In addition, the scattered cables also constitute a safety hazard. The present invention offers an efficient and economic solution to the said problem.

LIST OF THE DRAWINGS

The drawings attached to the application are not intended to limit the scope of the invention and the possible ways of its application. The drawings are intended only to illustrate the invention and constitute only one of many possible ways of its application.

FIG. No. 1 depicts an example of a standard multi-socket extension.

FIG. No. 2 depicts the box's frame (2).

FIG. No. 3 depicts the top cover (3).

FIG. No. 4 depicts the top cover (4).

FIG. No. 5 depicts the inner tray (5).

FIG. No. 6 depicts the handle (6).

FIG. No. 7 depicts the side profile of the frame (2), including the tracks (23) (231) (25).

FIG. No. 8 depicts the profile of the top cover (3), including the rim (31) and inward ending (311).

FIG. No. 9 depicts the profile of the bottom cover (4).

FIG. No. 10 depicts the frame (2) with the inner tray (5) installed in it.

FIG. No. 11 depicts part of the frame (2) and the track (24) and the close up depicts the protrusion (241) that constitutes the parts of the track (24).

FIG. No. 12 depicts the bottom of the top cover (3), including the guiding protrusions (32).

FIG. No. 13 depicts a side view of a frame (2) that is joined to another frame (2).

FIG. No. 14 depicts a frame (2) that is joined to another frame (2).

FIG. No. 15 depicts the frame (2) with the inner tray (5) installed in it.

FIGS. Nos. 16-18 depict the box (1).

FIG. No. 19 depicts a box (1) that is composed of two frames (2).

FIG. No. 20 depicts a box (1) that is composed of two frames (2) and contains a multi-socket extension and excess cables.

FIG. No. 21 depicts the box (1) whereby it is positioned on legs that are attached to the inner tray (5)

FIG. No. 22 depicts the modular combination of several frames.

THE INVENTION

The main function of the box (1), subject of the present invention, is to enable the user to place a multi-socket extension and excess cables inside the box (1) so that the electrical appliances are connected to the mains, i.e. to the multi-socket extension, and at the same time the multi-socket extension is not visible but rather concealed within the box. In addition, the box (1) also enables the user to place the excess cables, the electrical cables connecting the electrical appliance to the multi-socket extension, inside the box (1). In addition, the box (1) can be hung, including the multi-socket extension and the excess cables, so that is it not lying on the floor. Alternately, the box can be elevated off the floor using elevation legs. This enables the user to clean the floor of the room, which is unobstructed by the multi-socket extension and scattered cables. Moreover, using the box offers the user a safety advantage in that it prevents water from coming into contact with the electricity and prevents infants and children from touching the box's contents.

The present invention refers to a box (1) designed for storing a multi-socket extension and excess cables. The box (1), subject of the invention, comprises the following components: A frame (2), a top cover (3) and a bottom cover (4). The box (1) can also be equipped with an inner tray (5) and a handle (6).

The frame (2) is depicted, for instance, in Drawing No. 2. The frame comprises four circumferential sides and is designed, in fact, like a rectangular box that is missing its top and bottom sides. Nevertheless, the present invention and application cover the entire variety of possible shapes and designs for the frame (2) of the box (1), and they are not limited necessarily to the design depicted in the drawings. For instance, the box can have a fixed cover and only one removable cover; the multi-socket extension can be molded in the box as a fixed device; and so on.

The covers (3) (4) of the box are similar in principle to one another and are designed as depicted, for instance in Drawings Nos. 3 and 4. Each of the box's covers is actually a rectangular plate, of dimensions and size that correspond to the top and bottom openings of the frame (2) and they are designed to close the frame (2) from above and from below, respectively. The covers close the frame openings by sliding into sliding tracks. The present invention and application also cover the entire variety of possible shapes and designs for covers that correspond to the variety of possible designs and shapes for the frame (2), and they are not limited necessarily to the designs depicted in the drawings.

The inner tray (5) is depicted in Drawing No. 5. The tray is designed to serve in a number of roles: (a) As an internal partition within the box (1), enabling the user to place the multi-socket extension on the tray (5). In other words, the multi-socket extension is in the space between the tray (5) and the top cover (3) whereas the excess cables are in the space between the tray (5) and the bottom cover (4). (b) As a double bottom, enabling the user to remove the bottom cover and expose the bottom tracks so as to modularly join another box to the said box. Removing the cover from the second box enables to join together several boxes so that each box retains its inner space as a separate, independent unit thanks to the use of the inner tray (5). (c) As a modulation unit that enables partitioning of the large space formed when several frames are joined together. Insertion of trays (5) according to the user's needs enables to the user to plan the content of the boxes according to the size and quantity of accessories that are to be stored in them. The apparatus (cabinet), which is formed by joining together several boxes, enables the user to extract a box, or several boxes, for separate use as individual units. The apparatus also enables the user to use some of the boxes as drawers that can be extracted (to about ⅔ of their total length) for local use and servicing. The present invention and application cover the entire variety of possible shapes and designs for the tray (5), which corresponds to the frame (2), and they are not limited necessarily to the design depicted in the drawings.

The handle (6) is depicted, for instance, in Drawing No. 6. The handle (6) is meant to be attached to the side of the frame (2) and thus to enable the user to carry the box (1) and to easily and, in a non cumbersome manner, move it from place to place. The handle can be attached to the box in a variety of ways, for instance, by using two holes in the side of the frame to which the ends of the handle are attached. The present invention and application cover the entire variety of possible shapes and designs for the handle (6) of the box (1), and they are not limited necessarily to the design depicted in the drawings.

The frame (2) comprises two longitudinal sides (21) and two transverse sides (22). The upper outer edge of each longitudinal side (21) has an upper longitudinal protrusion (23) that in fact forms an upper outer track (23) (hereinafter referred to as the "upper longitudinal protrusion" and/or "upper longitudinal track"). The tracks (23) are designed to enable the user to slide the top cover (3) on and thus close the top opening of the frame (2). The tracks (23) are depicted in a side view, for instance, in Drawing No. 7.

As mentioned, the frame (2) comprises two longitudinal sides (21) and two transverse sides (22). The bottom edge of each longitudinal side is tapered inward, as depicted in the drawings. The bottom outer edge of each longitudinal side (21) has a bottom longitudinal protrusion (231) that in fact forms a bottom outer track (231) (hereinafter referred to as the "bottom longitudinal protrusion" and/or "bottom longitudinal track"). The bottom outer tracks (231) are in fact a recess that runs along the bottom outer edge of each longitudinal side (21). The tracks (231) are designed to enable the user to slide the bottom cover (4) on and thus complete the closure of the box (1). The bottom outer tracks (231) are depicted in a side view, for instance, in Drawing No. 7.

Each of the covers (3) (4) is actually a rectangular plate that corresponds to the top and bottom openings of the frame (2). The top cover (3) is shaped, as mentioned, like a rectangular plate whereby each of its two longitudinal sides has a down-facing rim (31) with a inward ending (311) shaped like the letter L, as depicted for instance in Drawing No. 8. The bottom cover (4) has the same shape, but is slightly narrower, as depicted, for instance, in Drawings Nos. 3 and 9.

The frame (2) is closed by sliding the top cover (3) over the frame (2) so that the rims (31) of the cover (3) are engaged in the frame's upper outer tracks (23), as depicted for instance in Drawing No. 14. The frame is further closed by sliding the bottom cover (4) into the bottom outer tracks (231) of the frame (2).

Inner tracks (24) can and should be added at the upper inner edge of each longitudinal side (21) so as to firmly fix the top cover (3) on the frame (2).

Likewise, two guiding protrusions (32) that correspond to the inner tracks (24) should be added to the cover (3). Drawing No. 11, for instance, depicts the inner track (24) and Drawing No. 10 depicts the guiding protrusions (32). When the upper opening of the frame (2) is closed by the cover (3), the guiding protrusion (32) is in the inner track (24) such that it fixes and reinforces the grip of the cover (3) on the frame (2). The ends of the guiding protrusion (32) can and should face the inside of the cover (3) so as to enable fast and easy insertion of the cover (3) onto the frame (2).

The connection track (24) is also designed to fix and reinforce the hold of the lower part (231) of the longitudinal side when joining one frame (2) to another frame (2), as depicted in Drawings Nos. 7 and 13.

In order to enable the user to join one frame (2) to another frame (2) (and/or in combination with additional frames in a modular manner), in the case of several multi-socket extensions and in any other case of need, such as when there are many cables in excess, the longitudinal sides (21) should include another track (hereinafter referred to as a "connection track") (25). The connection track is, in fact, a longitudinal recess, as depicted in Drawing No. 7. Drawings Nos. 13 and 14 depict the case in which one frame (2) is joined to another frame (2).

As mentioned, the frame (2) comprises two longitudinal sides (21) and two transverse sides (22). The transverse side (22) of the frame (2) is shaped like the letter H, as depicted for instance in Drawing No. 8. In other words, the top and bottom parts of the transverse side (22) are open. The above-mentioned openings on both ends of the frame are designed to accommodate the entry and exit of the cables. The cables can be fixed to the sides of the box using clasps or Velcro straps.

As mentioned, the inner tray (5) is designed to serve as an internal partition within the box (1). The inner tray (5) in fact comprises a long rectangular plate (51) with two longitudinal ribs (511) and two transverse ribs (512). A vertical rim (52), whose top edge bends outward, is attached to each of the transverse ribs (512) of the tray (5). The inner tray fits into the frame (2) so that the tray itself (in other words, its central part 51) is positioned in the frame's inner space and the rims (52) of the tray (5) hang and fit over the transverse sides (22) of the frame (2), as depicted for instance in Drawing No. 10.

The inner tray (5) can also serve as the box's elevation legs, for instance in cases in which the box is intended to be placed on the floor, thus preventing the penetration of water or moisture into the box, as depicted for instance in Drawing No. 21.

The box (1), subject of the invention, can be used in several possible ways:

(a) Multi-socket extension protection box: The bottom opening of the frame (2) is closed using the bottom cover. Then, the tray (5) is inserted into the frame, and the multi-socket extension is placed on it. The cables attached to the multi-socket extension are fixed to the sides of the frame using clasps or Velcro straps. Finally, the upper opening is closed.

(b) Cable storage and multi-socket extension protection box: One frame is joined to another frame. The bottom opening of the bottom frame is closed. The tray (5) is inserted into the upper frame. The multi-socket extension is placed on the tray. The excess cables are placed in the space in the bottom part of the frame. Finally, the upper opening is closed.

(c) Double volume protection box: The invention can be implemented by creating a double volume box that can contain both the multi-socket extension and the excess cables.

The box (1) and all its parts can be made from a variety of materials such as plastic, wood, metal, cardboard and so on. Nevertheless, the preferred option is that the box (1) and its parts be made of rigid plastic. The box can be made in a variety of dimensions, although the dimensions of the box should correspond to those of the multi-socket extension. The inventor believes that the appropriate size should be of the following dimensions: length 40 cm, width 12 cm and height 7 cm, although, as mentioned, the present invention and application refer and cover also other dimensions and sizes.

The box (1), subject of the present invention, is designed and is suitable for most standard multi-socket extensions. The box enables the user to concentrate, store and protect electrical cables of different lengths that are scattered around the multi-socket extensions. The box is also intended to enable the user to store chargers and transformers that belong to appliances such as mobile phones. Clasps and/or two-sided Velcro straps are positioned at the outlet from the box and prevent uncontrolled pulling out of electrical cables. The box should be made of a rigid material so as to prevent damage to the multi-socket extension and electrical cables within, and thus the box, subject of the invention, also serves as protection against external damages. Using the box (1) facilitates the connection and disconnection of electrical appliances.

Use of the box (1), subject of the present invention, entails many advantages in terms of convenience, aesthetics and safety.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

The box (1), subject of the present invention, can also be used to cover wall sockets and plugs—Use (d); as a shelf cabinet that is attached to the side of a desk—Use (e); and as a wall-mounted shelf cabinet—Use (f).

(d) Cover for wall sockets and plugs: Many structures have rows of wall sockets and plugs with dangling cables, constituting an eyesore and often also a safety hazard. The box (1) can be used as a decorative cover for a row of wall sockets and plugs, so as to give the wall a neat and orderly appearance.

When covering plugs in sockets that are built into the wall, the front cover (4) is attached to the frame (2) and both the plugs and the sockets are covered. The frame (2) is attached to the wall using an L-shaped hook, preferably made of metal, that has a thread on one end so as to enable it to be screwed into the wall (using a plug anchor for instance). The other end of the hook is bent at a 90 degree angle, forming an L-shape, and is designed to fit into the mounting track (25). Two such hooks are sufficient to effectively mount the box (1) on the wall. The cover (4) covers the front opening of the box (1). When the user wishes to remove or insert a plug, the box (1) is lifted off the hooks, the plug is removed or inserted. The box is then returned to its place on the hooks.

Another mounting option is using a bent metal strip. Two such strips are sufficient to effectively mount the box (1) on the wall. Here too, the cover (4) covers the front opening of the box (1). When the user wishes to remove or insert a plug, the box (1) is lifted off of the metal strips, the plug is removed or inserted, and the box is placed back on the metal strips. The metal strips can be fixed to the wall using either double-sided sticky tape or a screw and plug anchor. The user may also adjust the distance between the frame (2) and the wall by bending the top part of the metal strip and changing its angle, and thus changing the distance of the frame from the wall.

When covering plugs in sockets that protrude from the wall surface, the box is mounted on the wall using bent metal strips. These are similar in structure and function to the previously described metal strips, and may also be attached to the wall using double-sided sticky tape, for instance.

To secure the frame (2) to the wall, more than one bent metal strips should be used in the mounting track of the frame (2). The cables may be inserted into a vertical conduit that extends out from the box (1), so as to maintain an aesthetic appearance.

Safety closure to prevent access of children to sockets and plugs: Two additional hooks are provided parallel to the upper hooks, and their ends are rotated by 180 degrees so that their protruding ends lock the frame and secure it in such a way that prevents children from removing the frame. Inserting the external cover over the frame also restricts access to the plugs and sockets.

(e) Shelf cabinet attached to a desk: Desks are often time scattered with an abundance of small objects and accessories (such as staplers, hole makers, keys, and so on), that are not properly organized and thus interfere with the work being done on the desk. The box (1), subject of the present invention, offers a solution to this problem. The box (1) is attached to the edge of the desk such that the cover is located at the back and the box creates as a kind of open shelf in which accessories, such as those as mentioned above, may be stored. The frame (2) is attached to the desk with its openings facing front and back so that the long side of the frame (2) is parallel to and rests on the edge of the desk. The frame (2) is then attached to the desk using two metal clasps, thus turning the box (1) into a kind of storage cabinet, whereby the top of the frame (2) becomes a shelf.

The metal clasp is attached to the bottom of the box (1) using two metal clasps that are inserted from the side and from the front. The clasps can also be used to attach the inner tray (5) to the bottom of the box (1) so as to elevate it, and to join together two boxes in order to create a double-box structure.

The metal clasp is a strip of metal that is bent so as to form a top plate, a bottom plate, and a perpendicular plate. The top and bottom plates are more or less parallel to one another and they are joined at one end by the perpendicular plate. It is recommended that the frame (2) be attached to the desk using two clasps, one at each end of the frame (2).

As mentioned, the inner tray (5) may be positioned on the edge of the desk and used as a kind of shelf, whereby its two legs (52) provide elevation. The inner tray (5) is attached to the edge of the desk using the clasps that attach the tray's legs to the desk plate, resulting in a box that can serve as a kind of storage cabinet and a shelf.

The clasps may be attached using double-sided sticky tape. For instance, a clasp can be attached to the bottom of the box (1) and the top of the inner tray may be attached to the bottom of the box (1).

(f) Wall-mounted shelf cabinet: Small objects such as keys, eyeglasses, wristwatches, disk-on-keys, etc. are easily misplaced. The box, subject of the invention, may be mounted on the wall at a high and conspicuous location, at the user's eye height, offering a solution to this problem. The frame (2) can be mounted on the wall, so as to serve as a kind of shelf cabinet. In order to mount the frame (2) on the wall, the cover (4) is inserted into the rear opening and the box (1) is mounted using screws that are inserted into existing holes in the cover (4). The rear cover (4) may also be mounted on the wall using double-sided sticky tape, a method recommended particularly for use on tiled walls. Hooks may also be used to mount the frame (2) without the cover (4).

Additional hooks, whose ends are rotated by 180 degrees, may be used to further secure the frame to the wall. By sliding on a front cover as well, the box may be closed and its contents protected.

What is claimed is:

1. A box designed for storing a multi-socket extension comprising a frame, a top cover, a bottom cover, and an inner tray;

wherein the frame comprises two longitudinal sides and two transverse sides, such that each longitudinal side has an upper outer track that extends along an upper exterior side of the longitudinal side and another bottom outer track that extends along a bottom exterior side of the longitudinal side; wherein the two bottom outer tracks are designed so that the bottom cover may be inserted into them, thus closing a bottom opening of the box; and the two upper outer tracks are designed so that the top cover may be inserted into them, thus closing a top opening of the box;

wherein the top and bottom covers of the box are rectangular plates with sliding tracks in their longitudinal sides that are designed to provide closure of the box from the top and bottom, respectively; wherein each of the longitudinal sides of the top cover has a down-facing rim with an inward ending; whereby the bottom cover has the same shape as the top cover, but is slightly narrower;

wherein the inner tray serves as an internal partition within the box and comprises a long rectangular plate whose edges bend upward and outward; wherein the inner tray comprises a long rectangular plate with two ends; whereby a vertical rim, whose top edge bends outward, is attached to each end of said long rectangular plate; wherein the inner tray fits into the frame so that the tray itself is positioned in the frame's inner space and the rims of the tray hang and fit over the transverse sides of the frame.

\* \* \* \* \*